United States Patent [19]

Hoppner

[11] 3,947,111

[45] Mar. 30, 1976

[54] DOCUMENT FEEDING APPARATUS

[75] Inventor: Werner F. Hoppner, Webster, N.Y.

[73] Assignee: Xerox Corporation, Stamford, Conn.

[22] Filed: Apr. 26, 1974

[21] Appl. No.: 464,728

[52] U.S. Cl. ...................... 355/50; 271/274; 355/75

[51] Int. Cl.² .......................................... G03B 27/62

[58] Field of Search ............. 355/50, 18, 51, 75, 99, 355/102, 103; 271/264, 273, 274

[56] References Cited

UNITED STATES PATENTS

| | | | |
|---|---|---|---|
| 1,299,386 | 4/1919 | Schreck | 271/274 |
| 3,424,529 | 1/1969 | Liger et al. | 355/51 |
| 3,680,853 | 8/1972 | Houghton | 271/274 X |
| 3,689,151 | 9/1972 | Holmann | 355/50 X |
| 3,696,717 | 10/1972 | Honma et al. | 355/50 X |
| 3,741,647 | 6/1973 | Harris | 355/50 |
| 3,743,406 | 7/1973 | Konori et al. | 355/51 X |

*Primary Examiner*—L. T. Hix
*Assistant Examiner*—E. M. O'Connor
*Attorney, Agent, or Firm*—Paul Weinstein; Clarence A. Green; James J. Ralabate

[57] ABSTRACT

An apparatus is provided for feeding individual sheets. The apparatus includes means for feeding the sheets which comprises at least one roll. Means are included for biasing the roll against the sheet with a first force normal to the sheet for a sheet having a thickness up to a first thickness and for step-wise increasing the first force to a second force normal to the sheet for sheets having a thickness greater than the first thickness. A reproducing apparatus including the above-noted sheet feeding apparatus is also provided.

18 Claims, 6 Drawing Figures

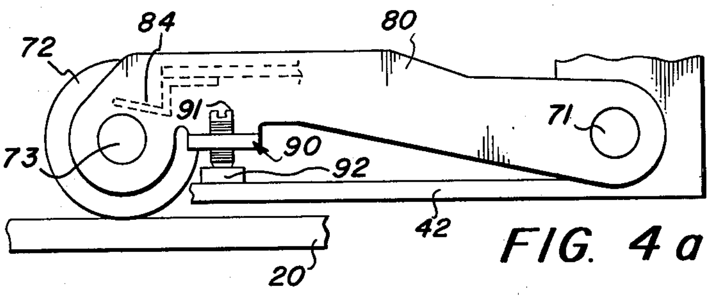
FIG. 4a
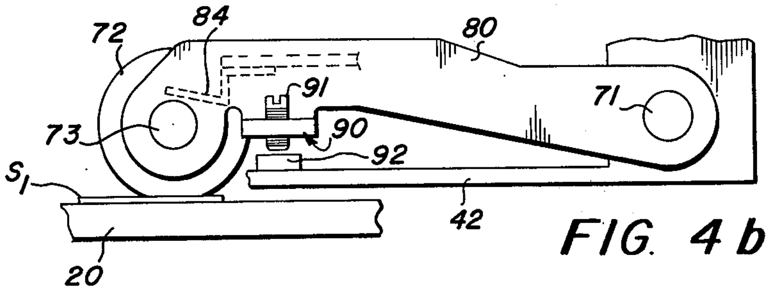
FIG. 4b
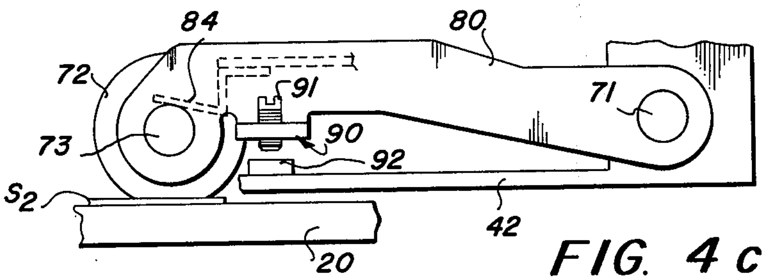
FIG. 4c
FIG. 4

DOCUMENT FEEDING APPARATUS

This invention relates to an apparatus for feeding individual sheets. The apparatus is particularly adapted for use as a document feeder for a reproducing machine for feeding documents over a transparent platen.

Numerous document feeders for use with reproducing machines are known as exemplified by U.S. Pat. Nos. 3,499,710, granted Mar. 10, 1970, to Sahley; 3,556,512, granted Jan. 19, 1971, to Fackler; 3,674,363, granted July 4, 1972, to Baller et al., and 3,790,158, granted Feb. 5, 1974, to Summers et al. These patents are representative of the broad prior art in this area directed to document feeders for placing a document on a transparent viewing platen for viewing by the optics of a reproducing machine for making copies of the document. The first named patent shows the use of friction rolls for transporting the document over the platen, and the remaining patents show the use of belt type transport devices.

In U.S. Pat. Nos. 3,685,905, granted Aug. 22, 1972, to Marshall et al., and 3,747,918, granted July 24, 1973, to Margulis et al, belt type feeders are provided with means internally of the belt to bias it against the platen.

An alternative type document feeder for use with a reproducing machine is that set out in U.S. application Ser. No. 367,996, filed June 7, 1973, now U.S. Pat. No. 3,900,258, to Hoppner. In accordance with the subject application a scanning optical system is fixed adjacent one margin of a transparent viewing platen and a document feeder is positioned overlying the optics to advance documents past the fixed optical system at a speed synchronized to the speed of an image receiving member.

It is a problem common to all document feeding systems wherein rolls or belts bear against a platen or against the document supported on the platen that abrasion of the transparent platen results with consequent defects in the resulting copies.

The document feeding apparatus employed in the IBM Copier II employs a combination of feed belts and back-up belts similar to that shown in IBM Technical Disclosure Bulletin, Vol. 15, No. 2, July 1972, at page 389. The disclosure bulletin indicates that the outer feed belts by themselves do not adequately insure feeding since they exert a low pressure against the document. Therefore, back-up belts which move in synchronized relationship to the outer feed belts are positioned within the loop of the feed belts and provide an additional urging force toward the direction of feed, and a normal assisting force to improve the feeding of the sheet. It is possible that the dual belt arrangement employed in the IBM Copier II will reduce platen abrasion due to the feed belts alone because of the generally lower normal force they impart to the platen, or a sheet fed over the platen.

However, the system employed is a complex one requiring separate outer and inner belts. Most document feeders, as for example, those shown in the previously noted patents employ one or more single belts with no back-up belts or one or more sets of rolls. It is highly desirable that some system be found for reducing platen abrasion for these other types of document feeding apparatuses.

In U.S. application Ser. No. 464,725, now U.S. Pat. No. 3,909,129, filed of even date herewith to Van-Buskirk, and assigned to the assignee of the instant invention, there is disclosed a document feeding apparatus wherein rolls, or rolls having a belt supported about their outer peripheries are biased against a platen glass with a first force when no sheet is being fed by the roll and with a second force larger than the first force when a sheet is being fed by the roll. In this manner, platen abrasion due to movement of the feed means when no sheet is being fed is substantially reduced. Other improvements also flow from the apparatus of the co-pending application.

The co-pending application, however, does not address the problem of platen abrasion which results during the actual feeding of a sheet. Most sheet materials fed over a transparent platen such as glass are abrasive to the glass during the feeding operation, particularly in the region under the feed means. Platen abrasion under the feed rolls during feeding of sheet material has been found to be a significant problem. The degree of platen abrasion is associated with the normal force which the feed means or rolls exert against the platen when the sheets are being fed. This normal force is selected depending on the type of sheet being fed, particularly sheet thickness and weight. It has been found that for thinner or lighter sheets the normal force required for proper feeding is low as compared to the force required for feeding thicker or heavier sheets. Since it is desired to provide a document feeder which can handle a wide range of document thicknesses, it has been the practice of the prior art to apply a normal force which is large enough to feed properly the full range of documents to be employed with the apparatus. This force is, therefore, greater than necessary for feeding many of the documents and, therefore, results in excess platen abrasion.

It is recognized that the feed means in some document feeders are biased against the platen by springs. The deflection of these springs increases with increasing document thickness and, therefore, the force applied by the springs also increases. It has been found, however, that the range of normal force increase due to the deflection of the springs over the range of conventional document thicknesses is not great enough to ensure consistently uniform feeding of thick documents if the initial force is set to be just adequate for feeding thinner documents so as to reduce platen abrasion.

SUMMARY OF THE INVENTION

In accordance with this invention an apparatus is provided for feeding individual sheets or documents preferably over a transparent viewing platen. The apparatus includes means for feeding the sheets wherein the feeding means comprises at least one roll. The feeding means further includes means for biasing the roll against the sheet with a first force normal to the sheet for sheets up to a first thickness and for step-wise increasing the first force to a second normal force greater than the first force for sheets having a thickness greater than the first thickness.

The roll may have a web or belt supported about its outer periphery. For example, it could comprise the pulley of a belt transport type document feeder as described in the above-noted patents. The apparatus may further include additional means for step-wise increasing the second normal force to a third normal force greater than the second normal force for sheets having a thickness greater than the second thickness.

The sheet feeding apparatus of the present invention is particularly useful as a document feeder for a reproducing machine, particularly an automatic xerographic type machine. The apparatus of this invention provides an improvement with respect to the reduction of abrasion of the platen under the feed roll or rolls when sheets are being fed.

Accordingly, it is an object of this invention to provide an improved apparatus for feeding sheets.

It is a further object of this invention to provide an apparatus as above including means for varying the normal force exerted by the feed means upon the sheet in a step-wise fashion, depending on sheet thickness.

It is a still further object of this invention to provide a reproducing machine including the above-noted sheet feeding apparatus.

These and other objects will become more apparent from the following description and drawings.

BRIEF DESCRIPTION OF THE DRAWINGS

FIG. 4 is a series of partial side views of the sheet feeding apparatus of FIG. 1 illustrating the operation of the apparatus of this invention.

DETAILED DESCRIPTION OF THE PREFERRED EMBODIMENT

The invention will now be described by reference to a specific sheet feeding apparatus in accordance with this invention in which a biasing means, as will be described in detail hereinafter, has been included. the sheet feeding apparatus to be described comprises a document feeder for providing an optical exposure of moving original, however, the invention is not limited thereto. This invention is broadly applicable to sheet feeding, but it finds particular application to the feeding of original documents over a transparent platen.

The apparatus of this invention has been applied to a reproducing machine of the type set out in the above-noted U.S. application Ser. No. 367,996. For purposes of example therefor, specific reference will now be made to the reproducing machine of the aforenoted application and to the document feeding apparatus in accordance with this invention incorporated in it. While the document feeder which will be described with reference to that machine is of the type for providing a moving original type exposure system, the invention as noted is not limited thereto. The document feeding apparatus of this invention may be applied to stationary original exposure systems as well.

Figure 1:
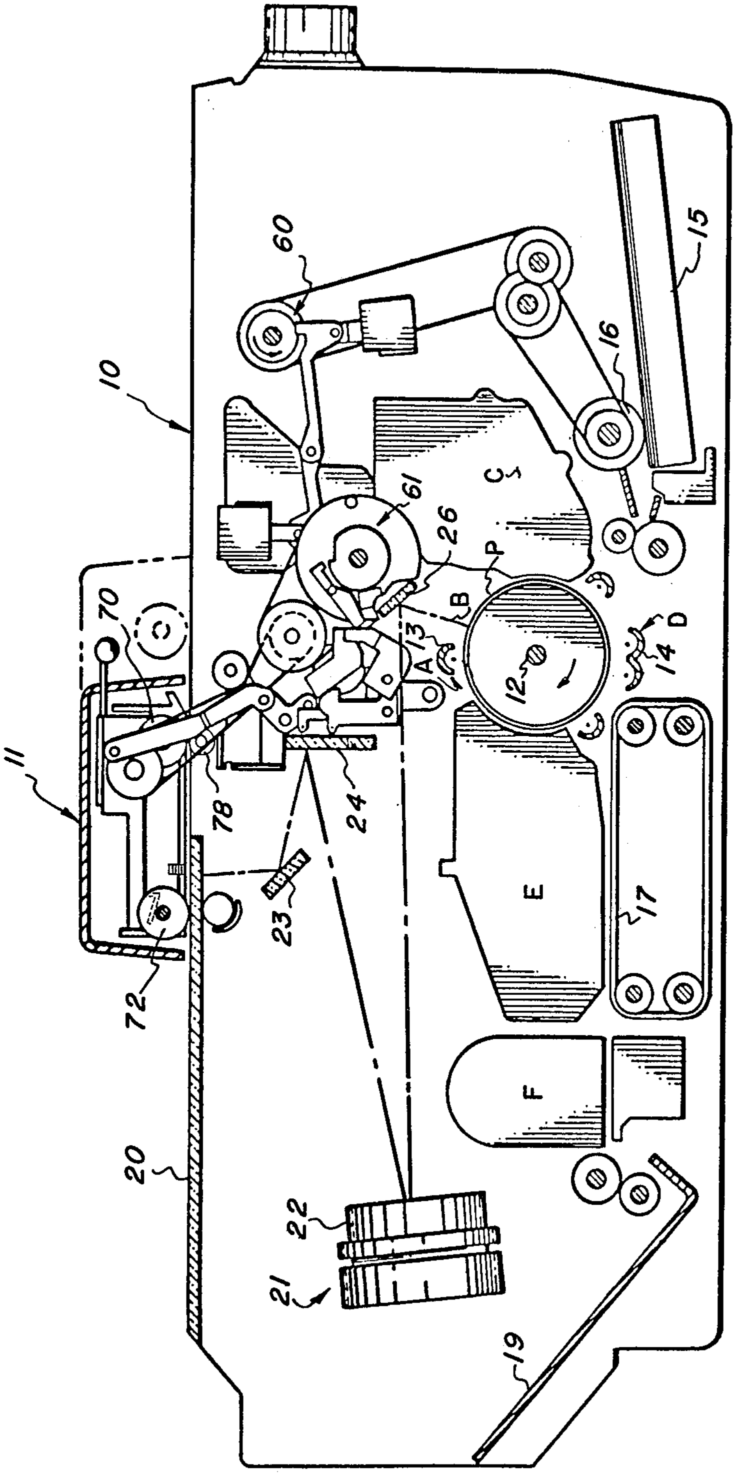
FIG. 1 is a schematic representation of a reproducing machine including a sheet feeding apparatus in accordance with one embodiment of the present invention.

Referring now to FIG. 1, there is illustrated a schematic side view of a compact automatic xerographic copying machine 10 incorporating the sheet feeding apparatus 11 of the present invention. The term compact copier, as herein used, refers to a machine of relatively small size, as for example, a desk type copier. Basically, the xerographic processor includes a rotatably mounted photoconductive drum P which is supported upon a horizontally extended shaft 12. The drum is driven in the direction indicated whereby its photoconductive surface is caused to pass sequentially through a series of xerographic processing stations.

Because the xerographic process is widely known and used in the art, the various processing steps involved will be briefly explained below in reference to FIG. 1. Initially, the photoconductive drum surface is uniformly charged by meeans of a corona generator 13 positioned within a charging station A located at approximately the 12 o'clock drum position. The charged drum surface is then advanced into an imaging station B wherein a flowing light image of an original document to be reproduced is projected onto the charged drum surface thus recording on the drum a latent electrostatic image containing the original input scene information. Next, subsequent to the exposure step in the direction of drum rotation is a developing station C wherein the latent electrostatic image is rendered visible by applying an electroscopic marking powder (toner) to the photoreceptor surface in a manner well known and used in the art. The now visible image is then forwarded into a transfer station D wherein a sheet of final support material is brought into overlying moving contact with the toner image and the image transferred from the plate to the support sheet by means of a second corona generator 14.

In operation, a supply of cut sheets are supported within the machine by means of a removable paper cassette 15. A pair of feed rollers 16 are arranged to operatively engage the uppermost sheet in the cassette so as to first separate the top sheet from the remainder of the stack and then advance the sheet into the transfer station in synchronous moving relationship to the developed image on the photoconductive plate surface. The motion of the feed rollers is coordinated with that of the rotating drum surface, as well as the other machine components through the main drive system whereby the support sheet is introduced into the transfer station in proper registration with the developed toner image supported on the xerographic plate. For further information concerning this type of sheet feeding mechanism, reference is had to co-pending U.S. patent application Ser. No. 205,911 filed in the name of Punnett et al.

After transfer, but prior to the reintroduction of the imaged portion of the drum into the charging station, the plate surface is passed through a cleaning station E wherein the residual toner remaining on the plate surface is removed. The removed toner particles are collected within a container where they are stored subject to periodic removal from the machine.

Upon completion of the image transfer operation, the toner bearing support sheet is stripped from the drum surface and placed upon a moving vacuum transport 17 which serves to advance the support sheet into a thermal fusing station F wherein the toner image is permanently fixed to the sheet. The copy sheet with the fused image thereon is forwarded from the fuser into a collecting tray 19 where the sheet is held until such time as the operator has occasion to remove it from the machine.

Normally, when the copier is operated in a conventional mode, the original document to be reproduced is placed image side down upon a horizontal transparent viewing platen 20 and the stationary original then scanned by means of the moving optical system 21. The scanning system 21 fundamentally consists of a stationary lens system 22 positioned below the right hand margin of the platen as viewed in FIG. 1, and a pair of cooperating movable scanning mirrors 23 and 24. The lens is basically a half-lens objective having a reflecting surface at the stop position to simulate a full lens system. The two mirrors are slidably supported between a pair of parallel horizontally aligned guide rails (not shown). For a further description and greater details concerning this type of optical scanning system reference is had to co-pending U.S. application Ser. No. 259,181, now U.S. Pat. No. 3,832,057 filed in the name of Shogren.

In practice, mirror 23, herein referred to as the full rate scan mirror, is caused to move from a home position, directly below the left hand margin of the platen to an end of scan position below the opposite margin of the platen. The rate of travel of the scan mirror is equal to the peripheral speed of the rotating xerographic drum surface P. The second mirror 24 is simultaneously caused to move in the same direction as the scanning mirror at half the scanning rate. As the two mirrors sweep across the platen surface, an image of each incremental area thereon viewed by the scanning mirror is reflected towards the second mirror which, in turn, redirects the image back to the half lens system. The reflecting surface, positioned at the lens stop position, reverses the entering light rays and redirects the light rays back towards a stationary mirror 26 positioned directly above the drum surface at the exposure station B. In this manner a flowing light image containing the original input scene information is focused upon the charged photoconductive plate.

A wind up spring (not shown) is provided to restore the moving mirrors to a start of scan condition.

The copying apparatus 10 shown in FIG. 1 is provided with a document feeder 11 in accordance with this invention. The document feeder 11 is movable between a first stored position adjacent to the viewing platen 20 and a second operative position over the platen surface. Commensurate with the positioning of the feeder assembly over the platen, the moving optical system 21 is locked in a position to view documents as they are advanced by the document feeder over the platen and record a flowing light image of the input information upon the moving photoconductive plate surface P.

Figure 2:
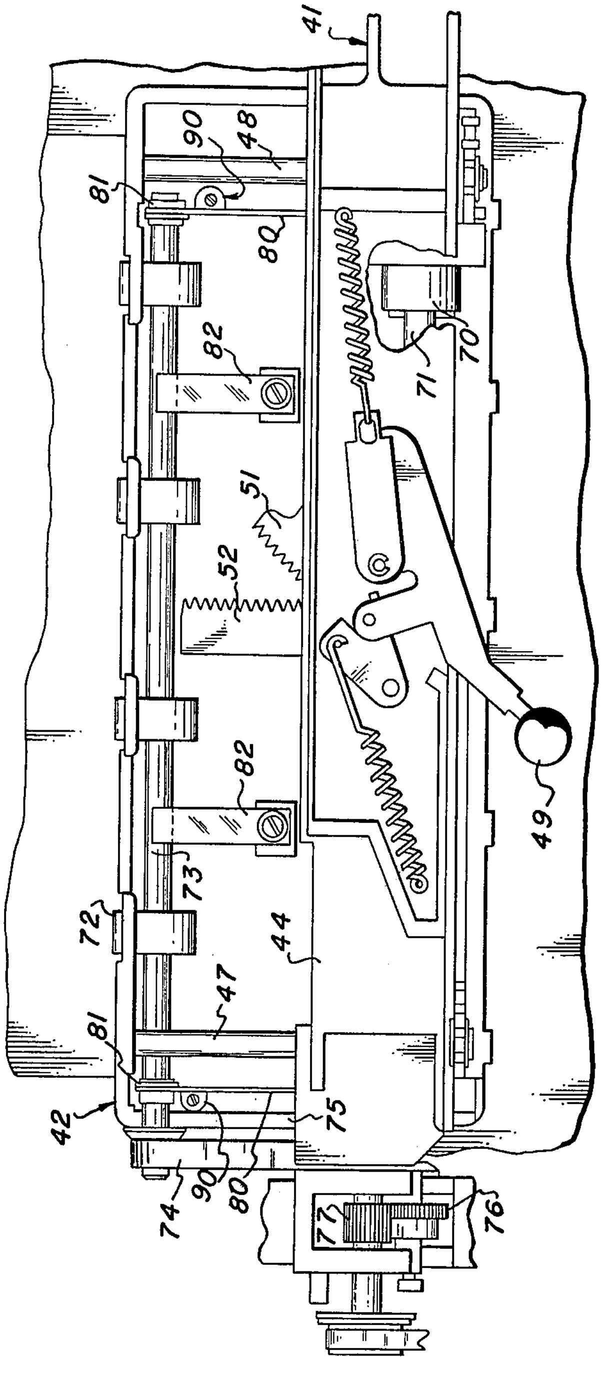
FIG. 2 is a top view of the sheet feeding apparatus of FIG. 1.

Referring now more specifically to FIGS. 1 and 2, there is shown the document feeding mechanism 11 associated with the instant invention. During normal operations, that is, when the moving optics are utilized to provide a flowing light image of the stationary original, the document feeding assembly is maintained in a stored position (as depicted by the phantom lines shown in FIG. 1) to expose the entire platen surface area and thus provide a maximum working area to the operator.

To initiate the moving document mode of operation, the machine operator simply advances the document feeding assembly 11 from the stored position to a document feeding position with the feeding assembly extending over the left hand margin of the platen surface. Fundamentally, the document feeding mechanism is made up of two main sections which include a stationary support bridge, generally referenced 41, and a movable feed roller support section, generally referenced 42. The bridge 41 is made up of two vertically extending end support members which are securely anchored in the machine frame and upon which is secured a horizontal span 44. The feed roller support section 42 is slidably suspended from the horizontally extended span 44 by means of a pair of parallel aligned rod like guide rails 47, 48 which are slidably supported in bearings (not shown) affixed to the underside of the bridge span. The document feed roll assembly is thus suspended from the span so that it can be freely moved back and forth from the home or stored position adjacent to the platen 20 and an extended position over the left hand margin of the platen surface.

In practice, at the start of the moving document handling conversion cycle, the machine operator grasps a lever arm 49 mounted on top of the bridge span and rotates the arm in a clockwise direction as shown in FIG. 2. The lever arm is operatively connected to segmented pinion 51 which meshes with a rack 52 secured to the feed roller assembly 42. Movement of the arm in a clockwise direction causes the movable feed roller assembly to be advanced toward the fully extended or operative position. Rotation of the arm in the opposite direction produces the opposite result.

Manually moving the feed roller support assembly 42 to the extended position also physically closes the contacts of the large document mode switch (not shown) causing a signal to be sent to the main machine drive motor (not shown) actuating the motor. At the same time, a signal is also sent to the machine logic control system placing the machine in a single copy mode of operation. This latter step is required in order to move the optical system from its normal rest position, which is the start of scan position at the left hand end of the platen surface, to the end of scan position beneath the now fully extended feed roll assembly. However, during this initial conversion phase, no original is actually being processed and there is, therefore, no need to feed copy sheets through the copier. In point of fact, feeding a copy sheet during the conversion phase would have a deleterious effect on the various machine components as well as confusing the machine programming and registering system. To prevent this occurrence, means 60, as shown in FIG. 1, are provided for inhibiting the action of the paper feeder during the period when the machine is being converted to the moving document mode of operation. Means 61 are provided for locking the optics at the end of scan position during the moving original mode of operation. Means 61 comprises a lock-out mechanism which serves to both uncouple the drive shaft from the main drive system and hold the optics rigidly in a fixed position for viewing moving documents subsequently advanced through the document feeding assembly 11.

Further details of the inhibitor means 60 and lockout means 61 may be obtained by reference to the above-noted U.S. application Ser. No. 367,996.

The movable document feed roller support section 42 of the document feeder assembly is provided with two sets of co-axially aligned rollers comprising a first set of drive rollers 70 mounted upon shaft 71 and a second set of hold down rollers 72 mounted upon hold down shaft 73. The two roller supports shafts are connected by means of a timing belt 74 whereby each set of rollers is adapted to turn in coordination with the other set of rollers. Shaft 71 is arranged to extend beyond the end wall 75 of the movable document feeder roll support section 42 and has a gear 76 pinned thereto. In operation gear 76 is adapted to move into and out of meshing contact with the stationary driven gear 77 as the document feed roll section is moved between a stored and fully extended position. When placed in a fully extended position, as shown in FIG. 2, gear 76 meshes with gear 77 thus causing both the document feed rollers 70 and the hold down rollers 72 to be rotated. Directly below the stationary bridge and adjacent to the platen margin are a set of pinch rollers 78 (FIG. 1) which are rotatably supported in the machine frame. The pinch rollers are arranged in the machine frame so as to coact with the feed rollers 70 when the document feeder 11 is in the operative position so as to advance a document introduced therebetween. In operation, the document is moved past the viewing domain of the now fixed optical assembly 21 and then into the pinch between the hold down rollers 72 and the platen 20 surface. The hold down rollers 72 serve to hold the document in sliding contact with the platen surface as the original is being moved past the optics.

The rolls 70 and 72 in the feeder 11 shown are continuously driven during machine operation even when no sheet is being fed.

Figure 3:
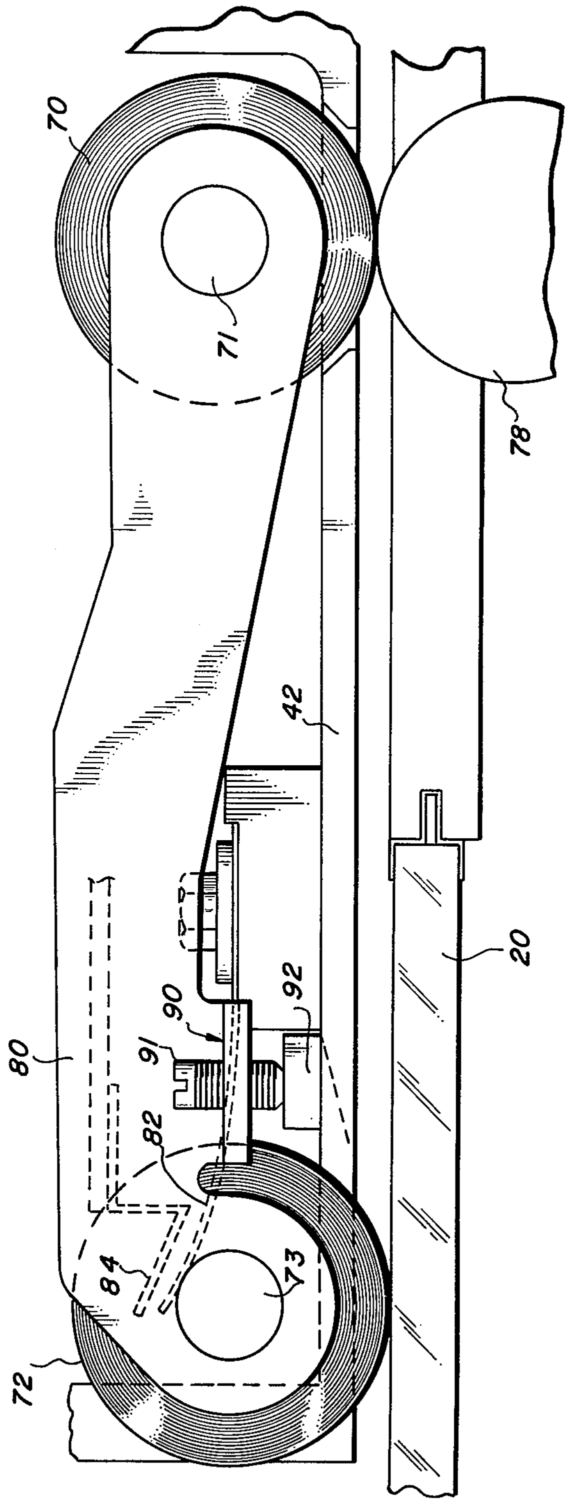
FIG. 3 is a partial side view of the sheet feeding apparatus of FIG. 1 showing a biasing means in accordance with the present invention.
Figure 5:
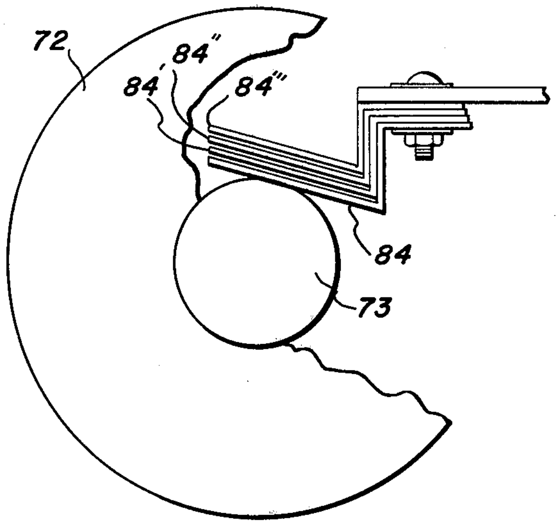
FIG. 5 is a partial side view of an alternative embodiment of a sheet feeding apparatus in accordance with this invention.

Referring now to FIGS. 3, 4, and 5, the apparatus 11 in accordance with this invention and the operation thereof will be described in greater detail. In FIG. 3 the hold down rolls 72 which are biased against the platen 20 are pivotably supported relative thereto by means of pivot arms 80 at each end of the shaft 73. The shaft 73 is journaled for rotation in the pivot arms 80 by means of bearings 81. The other end of the pivot arms 80 are pivotably supported about the shaft 70 of the upper pinch rolls 71. The hold down rolls 72 are biased into contact with the platen by means of leaf springs 82 which engage in cantilever fashion the shaft 73 of the hold down rolls.

The springs are mounted to the roll support section 42. These springs cause the rolls to be biased against the platen with a first force normal thereto and any sheet fed thereover It should be recognized that as a sheet is fed between the rolls 72 and the platen 20 the rolls are pivoted away from the platen an amount equal to the thickness of the sheet.

In accordance with this invention a second leaf spring 84 is provided which is mounted to the feeder 11 and is positioned to engage the shaft 73 after it has been deflected a given distance corresponding to a first maximum sheet thickness. For sheets having a thickness greater than this first thickness the second spring 84 engages the shaft 73 providing an additional normal force component exerted by the rolls 72 against the platen. This increases the first normal force in a stepwise fashion to a second force which is greater than the first force for sheets having a thickness greater than the first thickness.

The apparatus of FIG. 3 further shows a means 90 for reducing platen abrasion when no sheets are being fed in accordance with the above-noted co-pending patent application to VanBuskirk. This apparatus comprises a set screw 91 supported in threaded engagement with each of the pivot arms 80 and anvils 92 supported by the feed roll support section 42. By adjusting the screw 91 so that it partially lifts the pivot arms 80 away from the platen 20 the amount of force exerted by the rolls 72 against the platen as a consequence of the first leaf springs 82 is reduced when no sheet is fed, thereby reducing platen abrasion. When a sheet is being fed, however, the screw 91 is lifted off the anvil so that the full normal force imparted by the springs 82 is imparted to the sheet being fed and, in accordance with this invention, for thicker sheets the additional normal force component due to the springs 84 may also be imparted.

Referring to FIG. 4, the operation of the apparatus 11 of FIG. 3 is illustrated. In FIG. 4A a sheet is not being fed and the normal force reducing means 90 of the co-pending application is employed to reduce the normal force of the roll against the platen. Therefore, a portion of the normal force which would result from the biasing of the leaf springs 82 which are not shown in this Figure, is offset through absorption in the set screw 91 and anvil 92 arrangement. It is apparent that when a sheet is not being fed the additional normal force component which would be imparted by the second spring 84 is not so imparted since it is not engaged.

In FIG. 4B, a sheet $S_1$, having a thickness less than the first thickness is being fed. It is apparent that the normal force reducing apparatus 90 is now disengaged and the first normal force is applied by the action of the leaf springs 82 as aforenoted. The secondary spring 84 for applying the additional normal force is not engaged.

In FIG. 4C, a sheet $S_2$, thicker than the first thickness is being fed and in addition to the leaf springs 82 an additional normal force component is imparted by engagement of the springs 84 against the shaft 73.

Therefore, as a matter of example, if the leaf springs 82 were applying in FIG. 4B, a sufficient force to cause a normal force imparted by the rolls 72 against the platen of about 2 pounds, then in FIG. 4A the normal force reducing device could reduce that force to say, about 1 pound; whereas in FIG. 4C the normal force assisting spring 84 could increase that normal force to about 5 pounds or higher as desired.

In the previously discussed embodiments, a first normal force was applied for feeding sheets up to a first thickness and an increased second normal force was applied for feeding sheets greater than the first thickness. In accordance with FIG. 5, an alternative embodiment is shown wherein further normal assisting forces may be applied in step-wise fashion at further document thickness intervals. In FIG. 5, a plurality of normal force assisting springs 84, 84′, 84″, and 84‴ are provided. In this embodiment the cantilever leaf springs 82 have been eliminated since the first spring 84 is engaged to the shaft 73. The second spring 84′ is displaced or separated by a given distance from the first spring 84 and similarly the third spring 84″ is displaced from the second spring 84′ and the fourth spring 84‴ from the third 84″. The springs extend parallel to one another. In this manner it is possible, in accordance with the apparatus of FIG. 5, by engagement of the respective springs to apply a first normal force due to the action of the first spring 84 for documents up to a first thickness, and to then step-wise increase the normal force to a second normal force due to the action of the first and second springs 84 and 84′ for documents from a first thickness to a second thickness. Similarly the normal force can be step-wise increased to a third normal force due to the action of the springs 84, 84′ and 84″ for documents from the second thickness to a third thickness, and to further step-wise increase the normal force to a fourth normal force due to the action of springs 84, 84′, 84″ and 84‴ for documents from the third thickness and up.

It should be apparent that any desired combination of normal forces increasing in step-wise fashion could be provided in correspondence to any desired thickness levels of the documents being fed. The number of such step-wise adjustments in normal force can be selected as desired. The wider the range of sheet thicknesses to be fed by the document feeder 11 the greater the number of step-wise changes in normal assisting force required.

It is believed that an apparatus as above-described would be highly useful in reducing platen abrasion due to the normal force exerted upon a sheet by a feed means since the normal force may be reduced to a level which is just satisfactory for the sheet thicknesses being fed. Therefore, a sheet feeder 11 can be designed which is adapted to handle a wide range of sheet thicknesses properly with the least amount of platen abrasion. For example, if a document feeder were used predominantly for feeding 20 pound paper, and much heavier stock such as 0.06 inch thick stock on an infrequent basis, in accordance with this invention platen abrasion could be substantially reduced. For feeding the 20 pound sheets a fairly low normal force would be employed whereas for the occasional feeding of the thicker sheets a higher normal force including the normal assisting force would be employed to obtain proper feeding.

Figure 6:
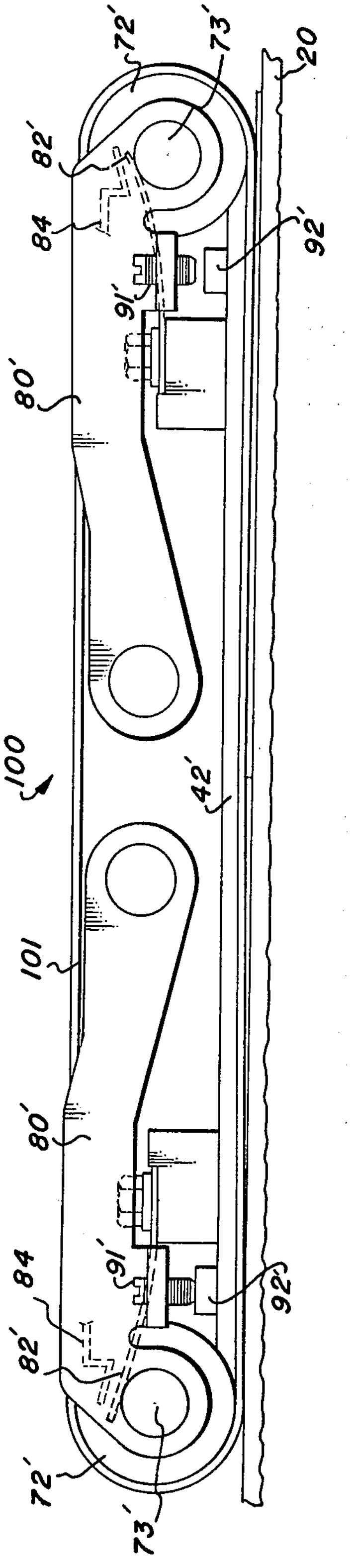
FIG. 6 is a side view of a sheet feeding apparatus in accordance with another embodiment of this invention employing a belt type transport.

Referring now to FIG. 6, it will be made apparent that the sheet feeding apparatus 11 of this invention is adaptable to other than roll type feeding systems. In FIG. 6, a belt type sheet feeding transport 100 is shown. A continuous belt or web 101 is supported about the outer periphery of two feed rolls 72' which, in this case, comprise the belt pulleys. Each of the rolls 72' is pivotably supported by means of pivot arms 80' just as in the previously discussed embodiments. Biasing means 82' and 84' are employed for each of the rolls. Each pivot arm 80' includes a set screw 91' and the roll support 42' carries the anvils 92'.

Therefore, it is apparent that just as in the previous embodiments each of the rolls 72' will apply a first force normal to the platen up to a first document thickness and then step-wise increase the normal force to a greater force for document thicknesses greater than the first thickness. Further, it should be apparent that biasing means 84 – 84''' of FIG. 5 could also be employed in the apparatus of FIG. 6.

The step-wise normal force adjustment of this invention depending on document thickness is principally the adjustment of the force under the feed rolls 72'. The force exerted by the belt against the sheet in the unsupported region is more a function of belt tension which probably will not be substantially affected by the apparatus of this invention.

The patents and applications specifically set forth in this application are meant in every respect to be incorporated by reference into the description.

It is apparent that there has been provided in accordance with this invention, a document feeding apparatus which fully satisfies the objects, means and advantages set forth hereinbefore. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. An apparatus for feeding individual sheets comprising:

means for feeding said sheets, said feeding means comprising at least one roll; and means for biasing said roll against said sheet, said biasing means comprising a first means for biasing said roll against said sheet with a force normal to said sheet within a first range of normal force, for a sheet having a thickness in a range up to a first thickness and second means for providing an additional normal force component within a range of normal force components for stepwise increasing said force normal to said sheet to an amount greater than said first range of normal force for sheets having a thickness in a range greater than said first thickness.

2. An apparatus as in claim 1, wherein said second means applies said additional normal force component for sheet thicknesses up to a second thickness; and wherein said biasing means includes third means for applying a further additional normal force component within a range of normal force components for further stepwise increasing the normal force of said rolls against said sheets for sheets having a thickness in a range greater than said second thickness.

3. An apparatus as in claim 1, wherein a web is supported about the outer periphery of said roll.

4. An apparatus as in claim 3 including a plurality of said feeding means and said biasing means.

5. An apparatus as in claim 1 further including a transparent platen and wherein said feeding means feeds said sheets across said platen and is biased against said platen.

6. An apparatus for feeding individual sheets comprising:

means for feeding said sheets, said feeding means comprising at least one roll;

means for biasing said roll against said sheet with a force normal to said sheet within a first range of normal force for a sheet having a thickness up to a first thickness and for stepwise increasing said normal force to a force normal to said sheet within a second range of normal force, for sheets having a thickness greater than said first thickness, said second range of normal force being greater than said first range of normal force, said biasing means comprising a first spring for biasing said roll against said sheet with said force within said first range of normal force, and at least one second spring arranged for providing said stepwise increase to a force within said second range of normal force when said roll is displaced by a thickness greater than said first thickness.

7. An apparatus as in claim 6, wherein at least one roll is carried by a shaft and wherein said second spring comprises a leaf spring having a surface for engaging said shaft, said surface being separated from said shaft by a distance equal to said first thickness.

8. An apparatus as in claim 3 including a plurality of said second springs mounted in cantilever fashion overlying one another, each of said second springs being separated from the next adjacent spring by a distance corresponding to a desired interval of sheet thickness.

9. In a reproducing apparatus for providing one or more copies of an original document, said apparatus including a transparent viewing platen for supporting said documents;

a moving photosensitive surface;

means for feeding said document over said platen;

means for projecting an image of said document on said moving photosensitive surface; and means for developing said image, the improvement wherein:

said feeding means comprises at least one roll, and means for biasing said roll against said document, said biasing means comprising a first means for biasing said roll against said document with a force normal to said sheet within a first range of normal force, for a document having a thickness in a range up to a first thickness, and second means for providing an additional normal force component within a range of normal force components for stepwise increasing said force normal to said sheet to an amount greater than said first range of normal force for sheets having a thickness in a range greater than said first thickness.

10. An apparatus as in claim 9, wherein said second means applies said additional normal force component for sheet thicknesses up to a second thickness; and wherein said biasing means includes third means for applying a further additional normal force component within a range of normal force components for further stepwise increasing the normal force of said rolls against said document for documents having a thickness in a range greater than said second thickness.

11. An apparatus as in claim 10 including a plurality of said second springs mounted in cantilever fashion overlying one another, each of said second springs being separated from the next adjacent spring by a distance corresponding to a desired interval of sheet thickness.

12. An apparatus as in claim 9, wherein a web is supported about the outer periphery of said roll.

13. An apparatus as in claim 12 including a plurality of said feeding means and said biasing means.

14. An apparatus as in claim 9 wherein said feeding means feeds said sheets across said platen and is biased against said platen.

15. An apparatus as in claim 9 wherein said projecting means comprises a fixed optical system for projecting an image of a moving original document and wherein said feeding means includes a first set of said rolls biased against said platen and a second set of feed rolls positioned upstream of said first set for feeding said document across said platen into the nip formed between said first set and said platen, said rolls advancing said document across said platen in synchronism with said moving photosensitive surface.

16. An apparatus as in claim 15 wherein said second set of feed rolls are positioned off said platen and are biased against a set of cooperating pinch rolls.

17. In a reproducing apparatus for providing one or more copies of an original document, said apparatus including a transparent viewing platen for supporting said document;

a moving photosensitive surface;

means for feeding said document over said platen;

means for projecting an image of said document on said moving photosensitive surface; and means for developing said image, the improvement wherein:

said feeding means comprises at least one roll, and wherein said feeding means includes means for biasing said roll against said platen with a force normal to said platen within a first range of normal force for feeding sheets having a thickness up to a first thickness and for stepwise increasing said normal force to a normal force within a second range of normal force greater than said first range of normal force for sheets having a thickness greater than said first thickness, said biasing means comprising a first spring for biasing said roll against said sheet with said force within said first range of normal force, and at least one second spring arranged for providing said stepwise increase to a force within said second range of normal force when said roll is displaced by a thickness greater than said first thickness.

18. An apparatus as in claim 17, wherein said at least one roll is carried by a shaft and wherein said second spring comprises a leaf spring having a surface for engaging said shaft, said surface being separated from said shaft by a distance equal to said first thickness.

* * * * *